US012068564B2

(12) United States Patent
Xiao et al.

(10) Patent No.: US 12,068,564 B2
(45) Date of Patent: Aug. 20, 2024

(54) CONNECTION STRUCTURE OF ALUMINUM CABLE AND TERMINAL AND VEHICLE INCLUDING SAME

(71) Applicant: BYD COMPANY LIMITED, Shenzhen (CN)

(72) Inventors: Hai Xiao, Shenzhen (CN); Jinlong Quan, Shenzhen (CN); Haidong Kang, Shenzhen (CN); Jiye Huang, Shenzhen (CN); Ye Yuan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/777,854

(22) PCT Filed: Nov. 27, 2020

(86) PCT No.: PCT/CN2020/132178
§ 371 (c)(1),
(2) Date: May 18, 2022

(87) PCT Pub. No.: WO2021/104436
PCT Pub. Date: Jun. 3, 2021

(65) Prior Publication Data

US 2023/0030577 A1 Feb. 2, 2023

(30) Foreign Application Priority Data

Nov. 28, 2019 (CN) ......................... 201922114520.6

(51) Int. Cl.
*H01R 4/02* (2006.01)
*H01R 4/62* (2006.01)
(Continued)

(52) U.S. Cl.
CPC ............. *H01R 4/023* (2013.01); *H01R 4/625* (2013.01); *H01R 11/12* (2013.01); *H01R 43/0207* (2013.01)

(58) Field of Classification Search
CPC ........... H01R 4/02; H01R 4/023; H01R 4/625
See application file for complete search history.

(56) References Cited

U.S. PATENT DOCUMENTS 10,475,552 B2 * 11/2019 Izumida ............... H01B 7/0009
2007/0243770 A1 * 10/2007 Hsieh ................. H01R 13/4361
439/701
(Continued)

FOREIGN PATENT DOCUMENTS

CN 101001712 A 7/2007
CN 101151769 A 3/2008
(Continued)

OTHER PUBLICATIONS

The World Intellectual Property Organization (WIPO) International Search Report for PCT/CN2020/132178 Feb. 26, 2021 4 pages (with translation).

*Primary Examiner* — Chau N Nguyen
(74) *Attorney, Agent, or Firm* — Wenye Tan

(57) ABSTRACT

A structure for connecting an aluminum cable and a terminal includes an aluminum cable and a terminal. The aluminum cable includes a cable core. The cable core is constructed with a cable welding portion. The terminal is welded to the cable welding portion. A nominal cross-sectional area of the cable core is M, and a welding area S between the cable welding portion and the terminal meets 5*M≤S≤6*M.

7 Claims, 3 Drawing Sheets

(51) Int. Cl.
*H01R 11/12* (2006.01)
*H01R 43/02* (2006.01)

(56) References Cited

U.S. PATENT DOCUMENTS

| | | | | |
|---|---|---|---|---|
| 2011/0198122 | A1* | 8/2011 | Sagawa | H01R 4/023 174/84 R |
| 2013/0333929 | A1* | 12/2013 | Ogawa | B23K 35/262 174/257 |
| 2014/0327303 | A1* | 11/2014 | Naganishi | H01B 5/12 307/10.1 |
| 2016/0079684 | A1* | 3/2016 | Naganishi | H01R 11/12 439/877 |
| 2016/0199932 | A1* | 7/2016 | Kern | H01R 4/187 439/874 |
| 2019/0260141 | A1 | 8/2019 | Tatsuo et al. | |
| 2020/0350099 | A1* | 11/2020 | Nakai | B60R 16/0215 |
| 2021/0184376 | A1* | 6/2021 | Kawata | H01R 4/62 |
| 2021/0265748 | A1* | 8/2021 | Scharkowski | H01R 43/0207 |

FOREIGN PATENT DOCUMENTS

| | | | |
|---|---|---|---|
| CN | 103430398 | A | 12/2013 |
| CN | 207069080 | U | 3/2018 |
| CN | 210985000 | U | 7/2020 |
| DE | 112014002304 | T5 | 2/2016 |
| EP | 3226353 | A1 | 10/2017 |
| JP | 2007012329 | A | 1/2007 |
| JP | 2012192413 | A | 10/2012 |
| JP | 2015135742 | A | 7/2015 |
| JP | 2015153604 | A | 8/2015 |
| JP | 2017004844 | A | 1/2017 |
| JP | 2018128447 | A | 8/2018 |
| WO | 2019215914 | A1 | 11/2019 |

* cited by examiner

CONNECTION STRUCTURE OF ALUMINUM CABLE AND TERMINAL AND VEHICLE INCLUDING SAME

CROSS-REFERENCE TO RELATED APPLICATIONS

This application is a national stage entry under 35 U.S.C. § 371 of International Application No. PCT/CN2020/132178, filed on Nov. 27, 2020, claims priority to Chinese Patent Application No. 201922114520.6, entitled "STRUCTURE FOR CONNECTING ALUMINUM CABLE AND TERMINA, AND VEHICEL HAVING SAME" and filed on Nov. 28, 2019, the entire contents of all of which are incorporated herein by reference.

FIELD

The present disclosure relates to the field of high-voltage connection technologies, and in particular, to a structure for connecting an aluminum cable and a terminal and a vehicle including the connection structure of the aluminum cable and the terminal.

BACKGROUND

An aluminum material has defects such as a low strength, poor creep resistance, and a surface easily oxidizable in air. Therefore, when a high-voltage wiring harness is connected with a copper terminal through an aluminum cable by ultrasonic welding instead of cold pressing crimping.

However, after the existing aluminum cable is connected with the terminal by ultrasonic welding, it is impossible to balance the electric conduction performance, overcurrent capability, and mechanical strength, and an improvement is required.

SUMMARY

The present disclosure aims to resolve at least one of the technical problems existing in the related art. Therefore, an objective of the present disclosure is to provide a connection structure of an aluminum cable and a terminal, and the structure for connecting the aluminum cable and the terminal can balance the electric conduction performance, overcurrent capability, and mechanical strength.

The present disclosure further provides a vehicle including the connection structure of an aluminum cable and a terminal.

According to an embodiment of a first aspect of the present disclosure, a structure for connecting an aluminum cable and a terminal is provided. The structure for connecting the aluminum cable and the terminal includes: an aluminum cable, including a cable core, where the cable core is constructed with a cable welding portion; and a terminal, welded to the cable welding portion, where a nominal cross-sectional area of the cable core is M, and a welding area S between the cable welding portion and the terminal meets 5*M≤S≤6*M.

The structure for connecting the aluminum cable and the terminal of this embodiment of the present disclosure can balance the electric conduction performance, overcurrent capability, and mechanical strength.

According to some specific embodiments of the present disclosure, if a width of the cable welding portion corresponding to the nominal cross-sectional area M is W, a length L of the cable welding portion meets 5*M/W≤L≤6*M/W.

According to some specific embodiments of the present disclosure, a surface of the cable welding portion facing away from the terminal is constructed as a wave surface, and a peak and a valley of the wave surface are distributed in a length direction of the cable welding portion.

According to some specific embodiments of the present disclosure, a minimum thickness H of the cable welding portion is a distance between a surface of the cable welding portion facing the terminal and the valley, a width of the cable welding portion corresponding to the nominal cross-sectional area M is W, and the minimum thickness H meets 0.7*M/W≤H≤0.8*M/W.

Further, a maximum angle between the peak and the surface of the cable welding portion facing the terminal ranges from 30° to 60° ; and a maximum angle β between the valley and the surface of the cable welding portion facing the terminal ranges from 30° to 60° .

According to some specific embodiments of the present disclosure, the aluminum cable further includes an insulating sleeve, sleeved on an outer side of the cable core, where the cable welding portion extends out of the insulating sleeve; and the terminal includes a terminal welding portion and a crimping portion, the cable welding portion is welded to the terminal welding portion, and the crimping portion is crimped to the insulating sleeve.

Further, a thickness of the crimping portion is less than a thickness of the terminal welding portion.

Further, the crimping portion includes a connecting portion and two crimping wings, one end of the connecting portion is connected with the terminal welding portion, the other end of the connecting portion is connected with the two crimping wings, and the two crimping wings clamp the insulating sleeve and are staggered in a length direction of the insulating sleeve.

Further, the length of the cable welding portion is L, and a length L1 of the connecting portion meets 0.7L≤L1≤0.9L.

According to an embodiment of a second aspect of the present disclosure, a vehicle is provided. The vehicle includes the structure for connecting the aluminum cable and the terminal according to the embodiment of the first aspect of the present disclosure.

According to the vehicle of this embodiment of the present disclosure, advantages such as reliable electric conduction performance, a strong overcurrent capability, and a high mechanical strength can be achieved by using the structure for connecting the aluminum cable and the terminal according to the embodiment of the first aspect of the present disclosure.

Additional aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description of the embodiments made with reference to the following accompanying drawings, where.

Figure 1:
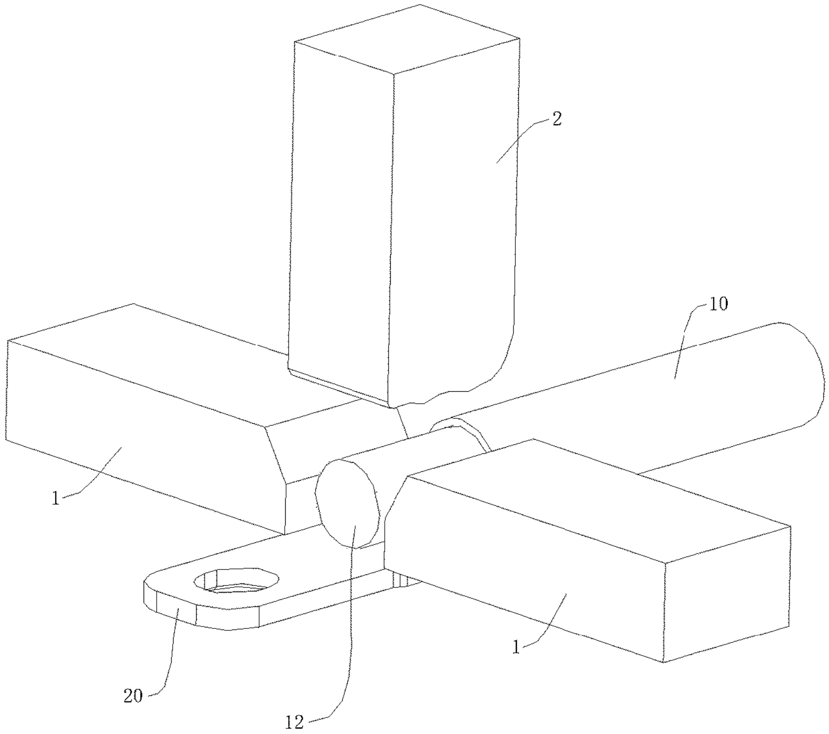
FIG. 1 is a schematic processing diagram of a structure for connecting an aluminum cable and a terminal according to an embodiment of the present disclosure.

List of Reference Numerals:

Aluminum cable 10, cable core 11, cable welding portion 12, insulating sleeve 13, wave surface 14, terminal 20, terminal welding portion 21, crimping portion 22, crimping wing 23, connecting portion 24, welding fixture 1, and welding head 2.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining the present disclosure, and should not be construed as a limitation on the present disclosure.

In the description of the present disclosure, it should be understood that orientation or position relationships indicated by the terms such as "length", "width", "thickness", "inside", and "outside" are based on orientation or position relationships shown in the accompanying drawings, and are used only for ease and brevity of illustration and description of the present disclosure, rather than indicating or implying that the mentioned apparatus or element needs to have a particular orientation or needs to be constructed and operated in a particular orientation. Therefore, such terms should not be construed as a limitation on the present disclosure.

The following describes a structure for connecting an aluminum cable and a terminal according to the embodiments of the present disclosure with reference to the accompanying drawings.

As shown in FIG. 2 to FIG. 5, a structure for connecting an aluminum cable and a terminal according to the embodiments of the present disclosure includes an aluminum cable 10 and a terminal 20.

The aluminum cable 10 includes a cable core 11, the cable core 11 is made of an aluminum material, and the cable core 11 is constructed with a cable welding portion 12. The terminal 20 may be a copper terminal, and for example, the terminal 20 is welded to the cable welding portion 12 in an ultrasonic welding manner.

A nominal cross-sectional area of the cable core 11 is M, and a welding area S between the cable welding portion 12 and the terminal 20 meets 5*M≤S≤6*M. It may be understood that, the nominal cross-sectional area M of the cable core 11 may be understood as a cross-sectional area of the cable core 11.

The following describes a welding process of the aluminum cable 10 and the terminal 20 according to the embodiments of the present disclosure through examples.

As shown in FIG. 1, an ultrasonic welding processing process mainly includes three steps: positioning, cable placing, and welding.

The terminal 20 is first placed on a positioning block of an ultrasonic welding device, two welding fixtures 1 on the left and right sides are movably pressed on the terminal 20, and a size between the two welding fixtures 1 on the left and right sides is limited to be a size of a welding head 2. The cable core of the aluminum cable 10 is placed in the two welding fixtures 1, and the welding head 2 moves downward vertically, to weld the exposed cable core 11 of the aluminum cable 10 and the terminal 20.

It should be understood that the cable core 11 is generally circular in shape, the part welded by the welding head 2 is pressed into a flat shape, namely, the cable welding portion 12, and the nominal cross-sectional area M of the cable core 11 in the embodiments of the present disclosure refers to a cross-sectional area of the circular part.

According to the structure for connecting an aluminum cable and a terminalin the embodiments of the present disclosure, because the mass of the aluminum cable 10 is ⅔ of the mass of a copper cable, and the cost of the aluminum cable 10 is ⅔ of the cost of the copper cable, objectives of cost reduction and light weight are achieved by using the connection structure of an aluminum cable and a terminal. Further, setting the welding area between the aluminum cable 10 and the terminal 20 to be 5*M≤S≤6*M can prevent the welding area from being excessively small or excessively large. To be specific, on one hand, if the welding area is excessively small, a high temperature is generated due to excessively concentrated welding energy, leading to over welding and an insufficient mechanical strength after welding, finally reducing the use reliability of the aluminum cable 10. On the other hand, if the welding area is excessively small, a current allowed to pass through per square millimeter of the welding area is excessively large, a welding part may be easily burnt out, leading to a short service life of the welding part. In addition, if the welding area is excessively large, a current allowed to pass through per square millimeter of the welding area is excessively small, and the electric conduction performance of the aluminum cable is further reduced. Therefore, by setting the welding area to be 5*M≤S≤6*M in the present disclosure, aluminum cables in different specifications can balance the electric conduction performance, overcurrent capability, and mechanical strength.

The following tests the overcurrent capability and the welding mechanical strength of the aluminum cable by using a cable core whose nominal cross-sectional area is 50 $mm^2$ as an example. Test results are shown in the following table:

| S/M | Overcurrent capability | Welding mechanical strength |
|---|---|---|
| 4.5 | 180 A | 2500 N |
| 5 | 200 A | 3000 N |
| 5.5 | 210 A | 3200 N |
| 6 | 200 A | 3000 N |
| 6.5 | 200 A | 3000 N |

As can be known from the foregoing table, when a value of S/M changes from 4.5 to 5.5, the overcurrent capability and the welding mechanical strength are both in an ascending trend, and when the value of S/M changes from 5.5 to 6.5, the overcurrent capability and the welding mechanical strength are both in a descending trend. Therefore, when the value of S/M is between 5 and 6, the aluminum cable has the optimal overcurrent capability and welding mechanical strength.

Meanwhile, when the value of S/M exceeds 6, the overcurrent capability and the welding mechanical strength change slowly. However, when the welding area is increased, due to expansion of the welding part and control over pressure on the welding part, welding process costs may be increased and a welding difficulty coefficient may be increased. Therefore, limiting the welding area S between the cable welding portion 12 and the terminal 20 to be 5*M≤S≤6*M can both balance the electric conduction performance, the overcurrent capability, and the mechanical strength, and control the welding difficulty coefficient and the welding process costs.

In some specific embodiments of the present disclosure, if a width of the cable welding portion 12 corresponding to the nominal cross-sectional area M is W, a length L of the cable welding portion 12 meets 5*M/W≤L≤6*M/W. In other words, for cable cores 11 with different nominal cross-sectional areas, the widths of the cable welding portions 12 thereof are fixed accordingly. For example, based on USCAR-38 (ultrasonic welding standards of the Society of Automotive Engineers), the length L of the cable welding portion 12 may be set to be 5*M/W≤L≤6*M/W, to ensure to achieve good electric conduction performance, overcurrent capability, and mechanical strength after the cable welding portion is welded to the terminal 20.

In the present disclosure, setting the length L of the cable welding portion 12 to be 5*M/W≤L≤6*M/W can prevent the length from being excessively short or excessively long. To be specific, on one hand, if the length L of the cable welding portion 12 is excessively short, the welding area is excessively small, a high temperature is generated due to excessively concentrated welding energy, leading to over welding and an insufficient mechanical strength after welding, finally reducing the use reliability of the aluminum cable 10. On the other hand, if the length L of the cable welding portion 12 is excessively long, the length of the terminal 20 is increased, the structure of a connector to which the structure for connecting an aluminum cable and a terminalis applied is re-designed, which increases design costs, as well as material costs of the terminal.

To describe the technical solutions of the present disclosure in more detail, an illustrative description is made by using the following two cables.

For example, the nominal cross-sectional area M of the cable core 11 is 50 mm$^2$, the width W of the corresponding cable welding portion 12 is 16 mm, and the length L of the cable welding portion 12 meets 15.6 mm<L<18.8 mm.

Further, the nominal cross-sectional area M of the cable core 11 is 70 mm$^2$, the width W of the corresponding cable welding portion 12 is 21 mm, and the length L of the cable welding portion 12 meets 16.7 mm≤L≤20 mm.

Figure 2:
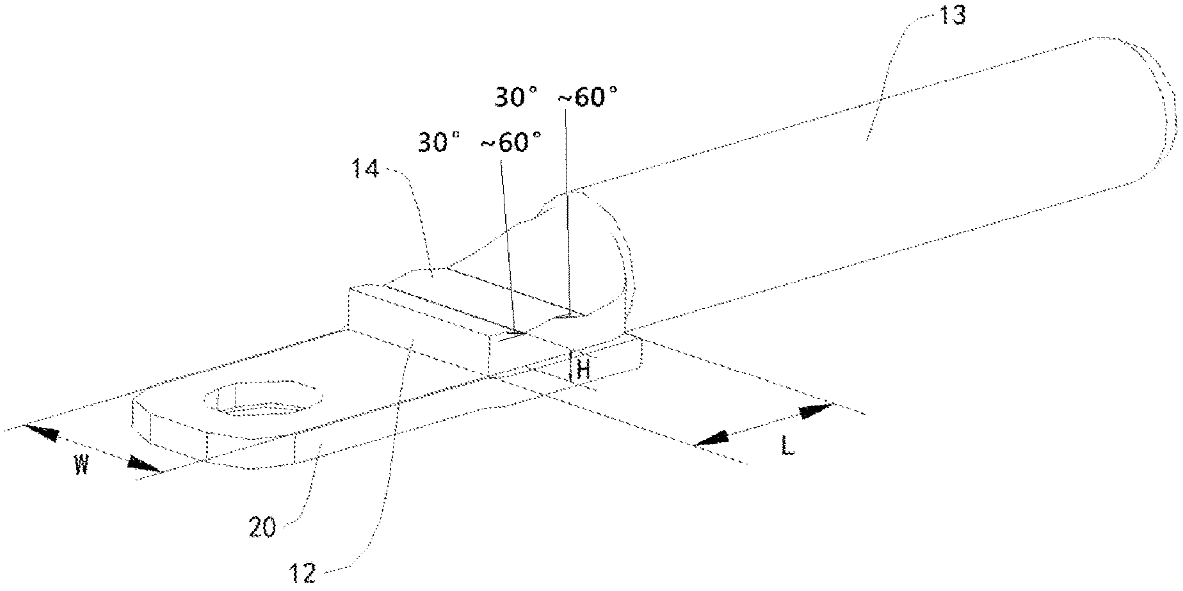
FIG. 2 is a three-dimensional diagram of a structure for connecting the aluminum cable and the terminal according to an embodiment of the present disclosure.
Figure 3:
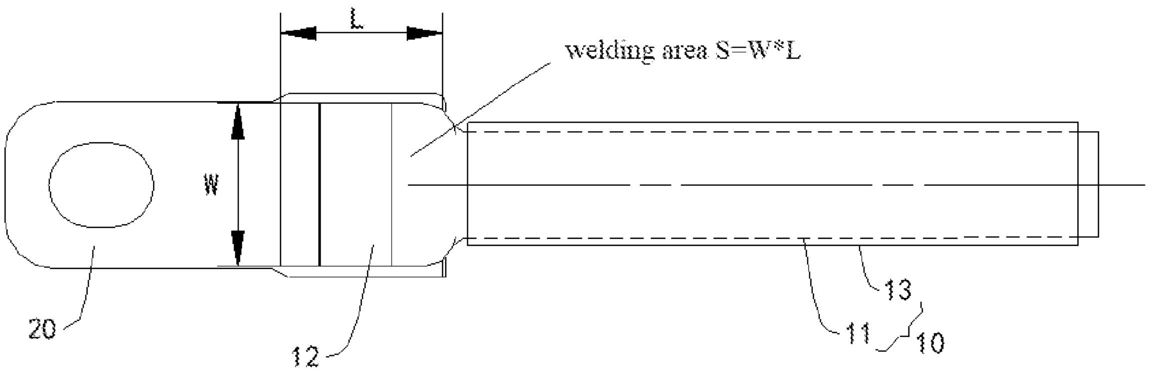
FIG. 3 is a front view of a structure for connecting the aluminum cable and the terminal according to an embodiment of the present disclosure.

In some specific examples of the present disclosure, as shown in FIG. 2, a surface of the cable welding portion 12 facing away from the terminal 20 is constructed as a wave surface 14, and a peak and a valley of the wave surface 14 are distributed in a length direction of the cable welding portion 12.

Figure 6:
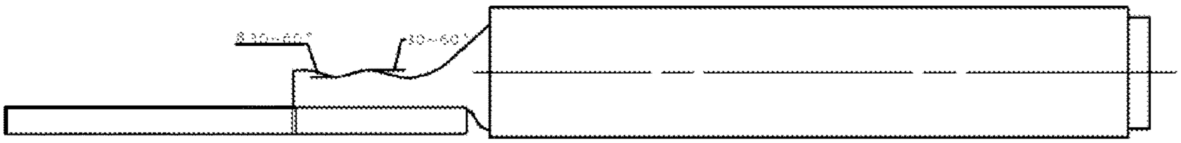
FIG. 6 is a front view of the structure shown in FIG. 2.

As shown in FIG. 2 and FIG. 6, a minimum thickness H of the cable welding portion 12 is a distance between a surface of the cable welding portion 12 facing the terminal 20 and the valley, a width of the cable welding portion 12 corresponding to the nominal cross-sectional area M is W, and the minimum thickness H of the cable welding portion 12 meets 0.7*M/W≤H≤0.8*M/W.

Therefore, the minimum thickness H of the cable welding portion 12 meets a compression ratio of 70% to 80%. When the minimum thickness H is less than the compression ratio of 70%, cable breaking of welding may easily occur, leading to a decrease in the electrical conductivity of the aluminum cable 10; and when the minimum thickness H is higher than the compression ratio of 80%, a risk that the welding mechanical tension strength does not reach the standard may easily occur. Further, good welding appearance can be achieved when the minimum thickness H of the cable welding portion 12 meets the compression ratio of 70% to 80%.

To describe the technical solutions of the present disclosure in more detail, an illustrative description is made by using the following cable.

For example, the nominal cross-sectional area M of the cable core 11 is 50 mm$^2$, the width W of the corresponding cable welding portion 12 is 16 mm, and the minimum thickness H of the cable welding portion 12 meets 2.2 mm≤H≤2.5 mm. Therefore, the welding compression ratio of the aluminum cable 10 meets 70% to 80%.

Further, a material strength of an aluminum conductor is relatively low. To avoid cable breaking of welding caused by excessively dense waves, the wave surface 14 adopts a welding texture with large and few waves. For example, the quantities of the peaks and the valleys of the wave surface 14 are both 2, namely, two peaks and two valleys are uniformly distributed on the wave surface 14 of the cable welding portion 12.

Still further, a maximum angle between the peak and the surface of the cable welding portion 12 facing the terminal 20 ranges from 30° to 60°. That is, an acute angle between a tangent line of a part of the peak closest to the valley and a welding surface of the cable welding portion 12 ranges from 30° to 60°.

A maximum angle β between the valley and the surface of the cable welding portion 12 facing the terminal 20 ranges from 30° to 60°. That is, an acute angle between a tangent line of a part of the valley closest to the peak and a welding surface of the cable welding portion 12 ranges from 30° to 60°.

A tensile strength of a cable core of a high-voltage aluminum cable used by new energy vehicles is generally from 70 MPa to 120 MPa, so that smooth transition of the welding surface of the aluminum cable 10 can be ensured by adjusting the angles of the peak and the valley, without causing damage to a surface of the cable core 11. Therefore, a larger effective welding area is provided between the cable welding portion 12 and the terminal 20.

In some specific embodiments of the present disclosure, the aluminum cable 10 further includes an insulating sleeve 13. The insulating sleeve 13 is sleeved on an outer side of the cable core 11, and the cable welding portion 12 extends out of the insulating sleeve 13. The terminal 20 includes a terminal welding portion 21 and a crimping portion 22, the cable welding portion 12 is welded to the terminal welding portion 21, and the crimping portion 22 is crimped to the insulating sleeve 13.

Figure 5:
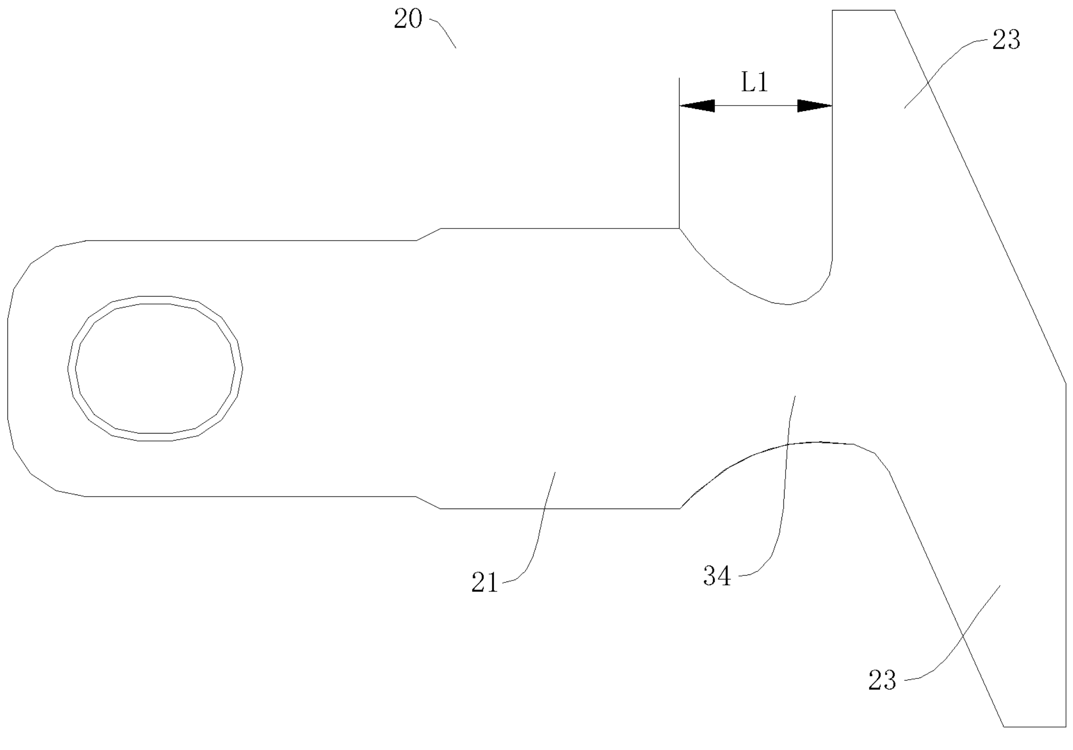
FIG. 5 is an unfolded schematic diagram of a structure for connecting the aluminum cable and the terminal according to another embodiment of the present disclosure.

Specifically, as shown in FIG. 5, the crimping portion 22 includes a connecting portion 24 and two crimping wings 23. One end of the connecting portion 24 is connected with the terminal welding portion 21, and the other end of the connecting portion 24 is connected with the two crimping wings 23. The two crimping wings 23 clamp the insulating sleeve 13, and the two crimping wings 23 are staggered in a length direction of the insulating sleeve 13.

Therefore, the crimping portion 22 includes the two staggered crimping wings 23, the insulating sleeve 13 of the aluminum cable 10 is arranged running through a channel formed by the two crimping wings 23, and the two crimping wings 23 are crimped to an outer surface of the insulating sleeve 13 of the aluminum cable 10 by using a crimping fixture. Therefore, the crimping wings 23 are fixedly connected to the insulating sleeve 13 of the aluminum cable 10, and the crimping wings 23 can transfer mechanical stress acting on a welding region to the insulating sleeve 13 of the aluminum cable 10, thereby effectively avoiding damage to the welding part caused by pulling the aluminum cable 10.

Figure 4:
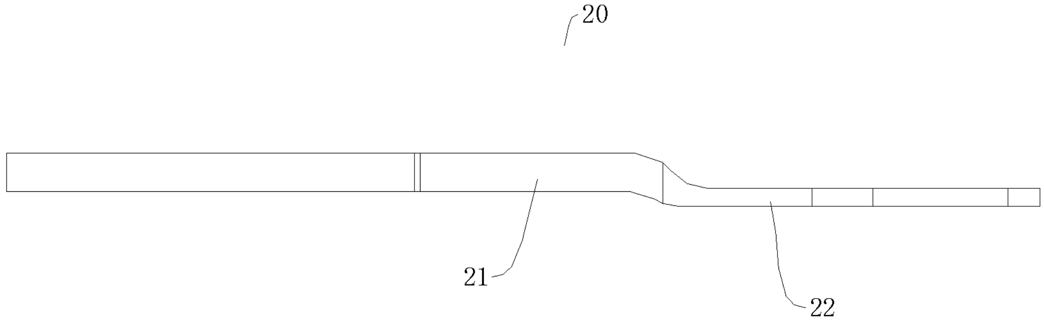
FIG. 4 is a side view of a structure for connecting the aluminum cable and the terminal according to another embodiment of the present disclosure.

Further, as shown in FIG. 4, a thickness of the crimping portion 22 is less than a thickness of the terminal welding portion 21, and in a radial direction of the aluminum cable 10, the crimping portion 22 is staggered in a direction away from the aluminum cable 10 relative to the terminal welding portion 21. For example, an upper surface of the crimping portion 22 and a lower surface of the terminal welding portion 21 lie in the same plane. In this way, a height difference of a transition region between the cable core 11 and the insulating sleeve 13 may be adapted, thereby avoiding excessive deformation of a junction of the cable core 11 and the cable welding portion 12.

Still further, as shown in FIG. 5, the length of the cable welding portion 12 is L, and a length L1 of the connecting portion 24 meets 0.7L≤L1≤0.9L. In this way, the junction of the cable core 11 and the cable welding portion 12 can be prevented from being damaged when the crimping wings 23 are crimped.

The following describes a vehicle according to an embodiment of the present disclosure. The vehicle includes the structure for connecting an aluminum cable and a terminal according to the foregoing embodiments of the present disclosure.

According to the vehicle of this embodiment of the present disclosure, advantages such as reliable electric conduction performance, a strong overcurrent capability, and a high mechanical strength can be achieved by using the structure for connecting a aluminum cable and a terminal according to the foregoing embodiments of the present disclosure.

Other configurations and operations of the vehicle according to this embodiment of the present disclosure are known to a person of ordinary skill in the art and will not be described in detail herein.

In the description of this specification, description of reference terms such as "a specific embodiment" or "a specific example", means including specific features, structures, materials, or features described in the embodiment or example in at least one embodiment or example of the present disclosure. In this specification, exemplary descriptions of the foregoing terms do not necessarily refer to the same embodiment or example.

Although the embodiments of the present disclosure have been shown and described, a person of ordinary skill in the art may understand that various changes, modifications, replacements, and variations may be made to the embodiments without departing from the principle and spirit of the present disclosure, and the scope of the present disclosure is as defined by the appended claims and their equivalents.

What is claimed is:

1. A structure for connecting an aluminum cable and a terminal, comprising:

an aluminum cable, comprising a cable core, wherein the cable core is constructed with a cable welding portion; and a terminal, welded to the cable welding portion, wherein:

the terminal overlaps with the cable welding portion to form a welding region between the cable welding portion and the terminal, and a nominal cross-sectional area of the cable core is M, an area of the welding region is, and 5*M≤S≤6*M, wherein a non-welding surface of the cable welding portion facing away from the terminal is constructed as a wave surface, and a peak and a valley of the wave surface are distributed in a length direction of the cable welding portion, and wherein a minimum thickness H of the cable welding portion is a distance between a surface of the cable welding portion facing the terminal and the valley, a width of the cable welding portion corresponding to the nominal cross-sectional area M is W, and the minimum thickness H meets 0.7*M/W≤H≤0.8*M/W.

2. The structure for connecting the aluminum cable and the terminal according to claim 1, wherein a length L of the cable welding portion meets 5*M/W≤L≤6*M/W.

3. The structure for connecting the aluminum cable and the terminal according to claim 1, wherein a maximum angle between the peak and the surface of the cable welding portion facing the terminal ranges from 30° to 60°; and a maximum angle β between the valley and the surface of the cable welding portion facing the terminal ranges from 30° to 60°.

4. A structure for connecting an aluminum cable and a terminal, comprising:

an aluminum cable, comprising a cable core, wherein the cable core is constructed with a cable welding portion; and a terminal, welded to the cable welding portion, wherein a nominal cross-sectional area of the cable core is M, and a welding area S of a welding region overlapped between the cable welding portion and the terminal, and 5*M≤S≤6*M, wherein a non-welding surface of the cable welding portion facing away from the terminal is constructed as a wave surface, and a peak and a valley of the wave surface are distributed in a length direction of the cable welding portion, wherein a minimum thickness H of the cable welding portion is a distance between a surface of the cable welding portion facing the terminal and the valley, a width of the cable welding portion corresponding to the nominal cross-sectional area M is W, and the minimum thickness H meets 0.7*M/W≤H≤0.8*M/W, and wherein the aluminum cable further comprises:

an insulating sleeve, sleeved on an outer side of the cable core, wherein the cable welding portion extends out of the insulating sleeve; and the terminal comprises a terminal welding portion and a crimping portion, the cable welding portion is welded to the terminal welding portion, and the crimping portion is crimped to the insulating sleeve, wherein a thickness of the crimping portion is less than a thickness of the terminal welding portion.

5. The structure for connecting the aluminum cable and the terminal according to claim 4, wherein the crimping portion comprises a connecting portion and two crimping wings, one end of the connecting portion is connected with the terminal welding portion, the other end of the connecting portion is connected with the two crimping wings, and the two crimping wings clamp the insulating sleeve and are staggered in a length direction of the insulating sleeve.

6. The structure for connecting the aluminum cable and the terminal according to claim 5, wherein the length of the cable welding portion is L, and a length L1 of the connecting portion meets 0.7L≤L1≤0.9L.

7. A vehicle, comprising a structure for connecting an aluminum cable and a terminal, wherein the structure for connecting the aluminum cable and the terminal comprises:

an aluminum cable, comprising a cable core, wherein the cable core is constructed with a cable welding portion; and a terminal, welded to the cable welding portion, wherein:

the terminal overlaps with the cable welding portion to form a welding region between the cable welding portion and the terminal, and a nominal cross-sectional area of the cable core is M, an area of the welding region is S, and 5*M≤S≤6*M, wherein a non-welding surface of the cable welding portion facing away from the terminal is constructed as a wave surface, and a peak and a valley of the wave surface are distributed in a length direction of the cable welding portion, and wherein a minimum thickness H of the cable welding portion is a distance between a surface of the cable welding portion facing the terminal and the valley, a width of the cable welding portion corresponding to the nominal cross-sectional area M is W, and the minimum thickness H meets 0.7*M/W≤H≤0.8*M/W.

* * * * *